June 21, 1960   C. S. BROAD   2,942,094
METHOD OF AND MEANS FOR MAKING SEAM-WELD
JOINTS BETWEEN METALLIC MEMBERS
Filed Sept. 8, 1958   2 Sheets-Sheet 2

Inventor
Charles Samuel Broad
by Albert E. Jacobs
Attorney

United States Patent Office 2,942,094
Patented June 21, 1960

2,942,094

METHOD OF AND MEANS FOR MAKING SEAM-WELD JOINTS BETWEEN METALLIC MEMBERS

Charles Samuel Broad, London, England, assignor to Gallay Limited, London, England, a company of Great Britain Filed Sept. 8, 1958, Ser. No. 759,711

Claims priority, application Great Britain Sept. 9, 1957

5 Claims. (Cl. 219—81)

This invention relates to methods of and means for making seam-weld joints between metallic members.

It frequently happens in the course of building up a sheet metal structure that two overlapping marginal portions which are required to be welded together are so disposed that it is not possible to place them between and in intimate contact with two complementary welding electrodes. It might be possible to apply one electrode intimately to one face of the joint, but the opposite face of the joint may be so shielded, covered or otherwise obstructed by other material or elements of the structure that it is not possible to apply the second electrode intimately to said opposite face. Consequently, and also in view of the mechanical pressure which requires to be applied to a joint, there has hitherto been some difficulty in making a perfect joint between the said two overlapping marginal portions, especially on very thin stainless steel sections due to the mechanical pressure required collapsing the obstructed cross sections, and this presents a particular problem when it is essential that all the joints in the structure should be perfectly tight, and the structure held to shape.

This problem arises, for example, in thermal insulating elements which are known as blankets, and which comprise a sheet metal envelope and a filling of insulating material. Elements of this kind are used for blanketing chambers or ducts through which hot fluids flow, for example, the jet pipe of an aircraft engine through which pipe hot gases flow.

One form of insulating element of the kind referred to comprises an envelope formed of sheets of thin stainless steel, with a filling of refractory fibre. The envelope is substantially rectangular in cross section, having facial walls, which for convenience will be referred to as top and bottom walls, which are comparatively long and wide with peripheral walls which are comparatively narrow, although in some cases the envelope may be curved longitudinally and/or transversely.

In the construction of such insulating elements, the marginal portions of the metal sheets which form the top and bottom walls may overlap each other and/or overlap other members so as to form said peripheral walls. During the course of such construction it is possible in most cases to secure overlapping portions to each other by seam-welding with the use of two jaws or electrodes of a seam-welding tool, the said overlapping portions being clamped between said jaws or electrodes. However, in order to complete the construction of the element it is usually necessary to effect a final weld or series of welds by the application of only one jaw or electrode of a welding tool to the outer face of the joined portions, because it is not possible to apply a second welding jaw or electrode to the opposite face which usually then is located within the envelope.

It has been proposed to effect such final weld by so designing and/or constructing the envelope that said final weld is located along the marginal portion of a top or bottom wall where said marginal portion overlaps a flange on a channel or angle section member which provides a peripheral wall of the blanket, disposing said peripheral wall between two rotatable wheel or roller welding electrodes so that one of said electrodes may be rolled along the said marginal portion of the top or bottom wall of the blanket and the other said electrode may be rolled along the margin of the opposite facial wall, causing said two wheel or roller electrodes to rotate so that they roll along said walls of the envelope, applying mechanical pressure to one or both of said electrodes whereby the web of said peripheral wall member is in compression, in a width-wise direction, between said electrodes, and passing an electric welding current between said electrodes. Such a method provides a seam-weld but it is not always wholly efficient because of the possibility that the comparatively high mechanical pressure applied to the electrodes (which comparatively high pressure is necessary because of the comparatively large contact area between both of said electrodes and the facial walls of the envelope, which large contact area is caused by the arcuate depression of a wheel periphery into the envelope facial wall) will cause the web of the peripheral wall member to collapse; especially is this so when the said web is comparatively thin, for example, approximately .015 inch thick.

The object of the present invention is to provide an improved method of, and improved means for making a seam-weld of a joint in a structure wherein said joint comprises two overlapping portions so relatively disposed in the structure that only one face of the joint can be intimately contacted by a welding electrode.

A method according to this invention for making a seam-weld joint between metallic members in a structure comprises disposing the said structure between a rotatable idler wheel electrode and a rod electrode, whereby the said rod electrode makes intimate contact with an accessible face of the joint, causing the structure to travel between said two electrodes whereby the rotatable idler wheel electrode is caused to rotate and the rod electrode is caused to remain in said intimate contact with the said accessible face of the joint throughout the length of said joint, applying pressure to said rod electrode in the direction towards said idler wheel electrode, and passing an electric welding current through said electrodes and said structure.

Means for carrying out the said method comprises an idly rotatable wheel electrode, a rod electrode, a holder for said rod electrode, said holder being adapted for mechanical pressure to be applied to said electrode in the direction of said wheel electrode, a movable bed adapted for the said structure to be secured thereto, said bed also being adapted to be disposed in such relation to said electrodes that upon said bed, together with the structure secured thereto, being moved the said joint in the structure is caused to travel between said electrodes with the said accessible face of the joint retained in contact with the rod electrode throughout the length of the joint.

One embodiment of the invention, adapted to effect a seam weld on the outer face of an arcuate insulating blanket, is illustrated in the accompanying drawings, wherein.

The apparatus comprises a cabinet 11 which contains an electric motor, electric transformers, relays, switchgear, and other ancillary apparatus for an electric welding circuit, a compressed air distribution system, and a water pump, none of which apparatus is material to the present invention.

Figure 1:
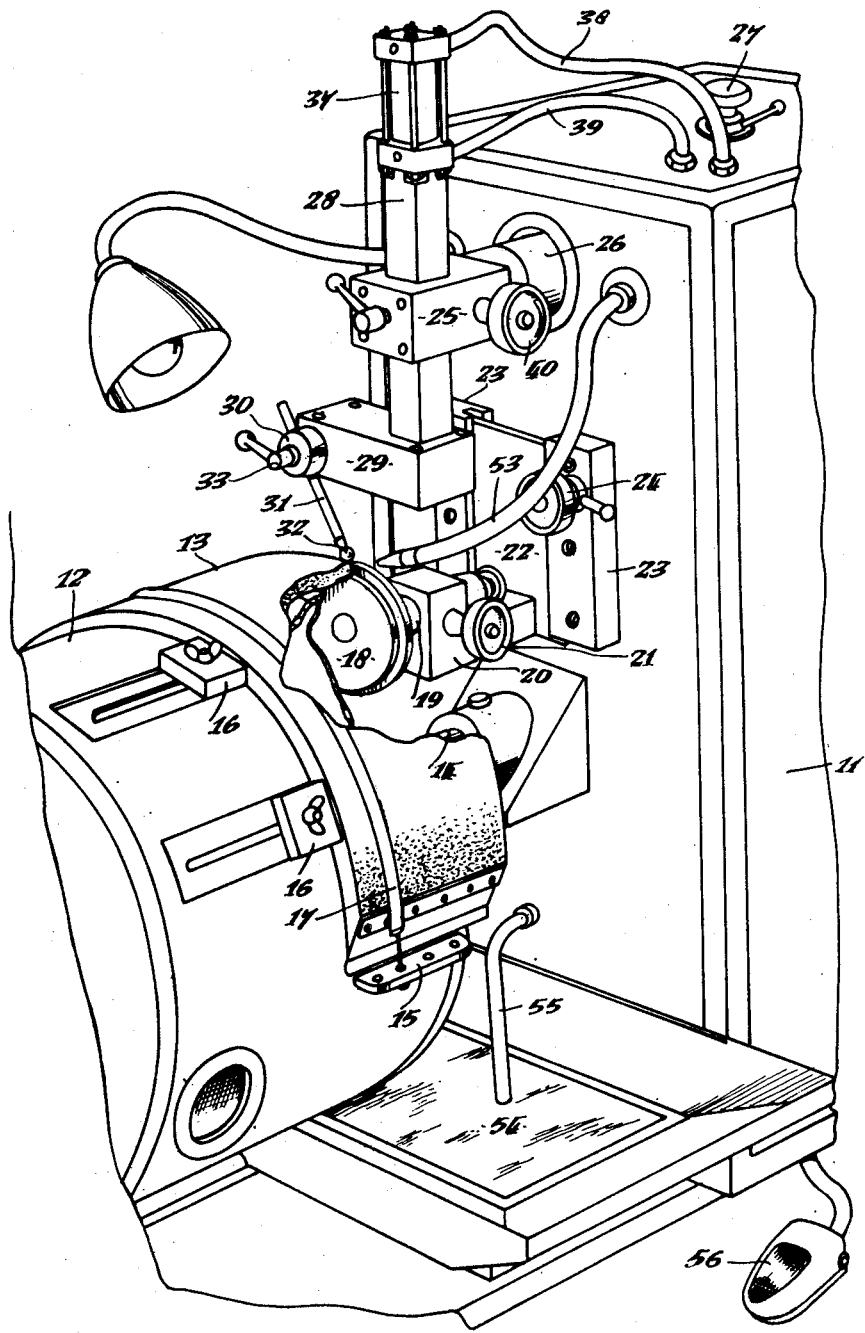
Fig. 1 is a perspective view of the apparatus.

Outside of the cabinet 11 there is provided a rotatable cylindrical drum 12 which provides a bed for an arcuate blanket 13. The drum 12 is supported by suitable bearings and is driven rotatably by the motor through a shaft 14. The external diameter of the drum 12 is such that the arcuate blanket 13 may lie on the outer face of the drum in intimate contact therewith. Means are provided for positioning and securing the blanket on the drum; for example, end stops 15 (only one of which is illustrated in Fig. 1) are secured to the drum to engage the ends of the blanket and thereby prevent rotation of the blanket relative to the drum, whilst adjustable stops 16 abut an edge of the blanket to prevent axial movement, in one direction, of the blanket on the drum. An elastic strap 17 is wrapped over the blanket and is secured by its ends to the end stops 15 to hold the blanket down on to the surface of the drum.

Figure 2:
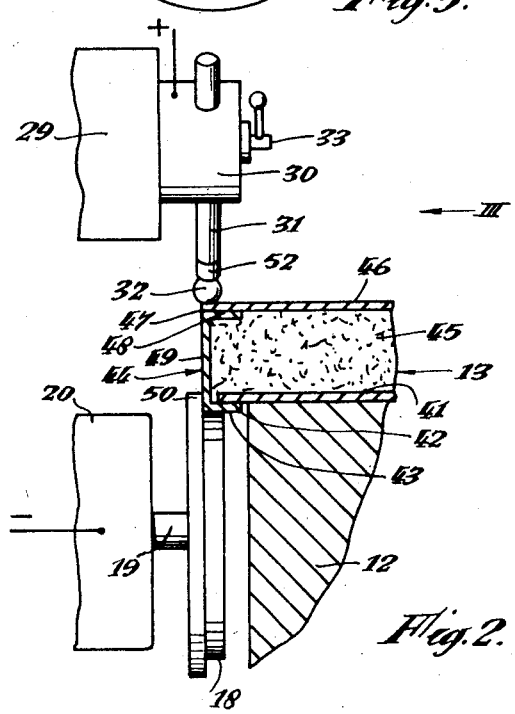
Fig. 2 is an enlarged fragmentary side elevation of part of the apparatus looking in the direction of arrow II in Fig. 3.

The blanket 13 is so mounted on the drum 12 that the edge of the blanket remote from the stops 16 overhangs the end of the drum, as shown in Fig. 2.

There is provided a rotatable wheel electrode 18, made of copper, which is freely rotatable about the axis of the supporting shaft 19, which axis is parallel to the axis of the drum 12. The shaft 19 of the electrode 18 is carried in a bottom holder 20 in such manner as to allow rotation of the electrode whilst retaining good electricity conduction between the holder and the electrode. Axial adjustment of the spacing of the electrode from the holder is provided for and the attained position is secured by locking means 21 (Fig. 1). The holder 20 is mounted on a plate 22 which is mounted slidable vertically in conductor blocks of brackets 23 which are secured to but electrically insulated from the cabinet 11. The plate 22 may be adjusted vertically in the blocks 23, to adjust the vertical position of the wheel electrode 18, and the attained position is secured by a locking clamp 24. There is efficient electricity conduction from the blocks 23 through the plate 22, head 20 and shaft 19, to the electrode 18, and said blocks 23 are connected to one pole of the electricity supply means within the cabinet.

A bracket 25 is connected by a horizontal bar 26 to the second pole of the electricity supply means within the cabinet. The position of the bracket 25 may be adjusted horizontally to or from the cabinet, and the attained position is secured by locking means 27. A column 28 is mounted slidable vertically in the bracket 25, and said column is provided at its lower end with a top welding head 29. A carrier 30 is mounted, rotatable on a horizontal axis parallel to the shafts 19 and 14, in the top welding head 29, and said carrier carries a rod electrode 31. The electrode 31 is rotatable about its axis in the carrier 30 to bring a new portion of the tip 32 of the electrode into the welding position; the electrode 31 is secured in the carrier 30 by a clamp 33.

Figure 3:
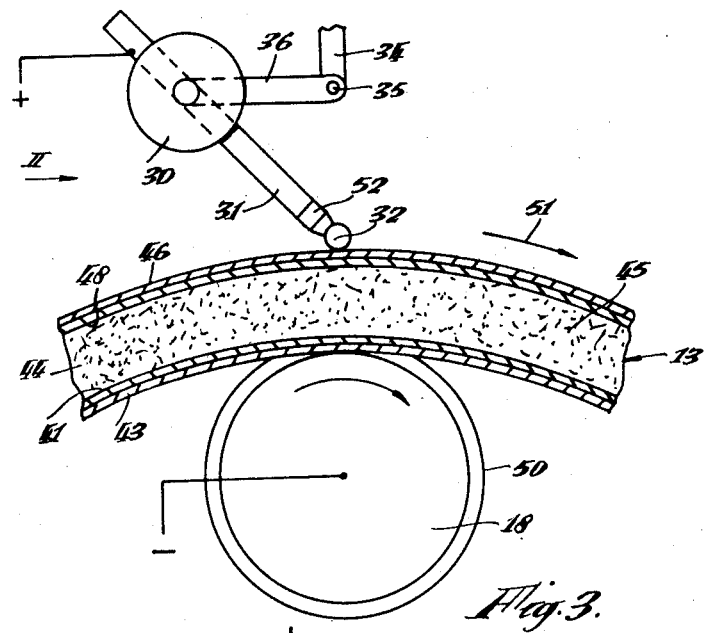
Fig. 3 is a front elevation looking in the direction of arrow III in Fig. 2.

A rod 34 (Fig. 3) is disposed vertically within the column 28, and its lower end is connected pivotally at 35 to the outer end of a lever 36 disposed within the welding head 29 (which is hollow), the inner end of the lever 36 being secured to the carrier 30. The upper end of the rod 34 is secured to a plunger disposed within an air cylinder 37 mounted on the top end of the column 28. By passing compressed air, through pipes 38, 39 to the air cylinder 37 the carrier 30 can be rotated in either direction in the head 29 to press the rod electrode 31 down on to the work (the blanket 13) at a pressure controlled by suitable controls mounted on the cabinet or raise the said electrode off the work. There is efficient electric current conduction from the bar 26 through the bracket 25, column 28, welding head 29 and carrier 30 to the rod electrode 31. Vertical adjustment of the top welding head 29 is effected by moving the column 28 in the bracket 25, and the attained position is secured by a locking clamp 40.

The blanket 13 comprises a bottom wall 41 (Figs. 2 and 3), to the marginal portions of which are welded, at 42, the bottom flanges 43 of channel-section peripheral walls 44 (only one peripheral wall is shown). The welds at 42 can be effected in normal manner by welding electrodes disposed one at each face of the weld, before the filling 45 of refractory fibre and the top wall 46 are placed in position. When all the welds 42, that is, around all the margins of the bottom wall 41, have been made, the filling 45 is placed in position, and then the top wall 46. Final welds 47 now have to be made in order to weld the marginal portions of the top wall 46 to the top flanges 48 of the peripheral walls 44, and it is these final welds 47 which cannot be effected in the normal manner, because it is not possible to apply an electrode to the inner faces of the flanges 48. Consequently, the said final welds 47 are made by the apparatus according to this invention.

In use the arcuate blanket 13 is placed around the drum 12 and is positioned thereon by the stops 15 and 16. The blanket is then secured to the drum by the elastic strap 17 (there may be several such straps). The top wall 46 of the blanket, with its marginal portions overlapping the flanges 48 of the peripheral walls 44, will be the outer face of the blanket. The blanket 13 is so positioned on the drum 12 that the corner formed at the junction of the bottom flange 43 and web 49 of a channel-shaped peripheral wall 44 will engage in intimate contact with the periphery and an annular flange 50 of the wheel electrode 18 (Fig. 2).

The rod electrode 31 is so positioned that, when the electrode is pressed down on to the work, the tip 32 will be above the axes of the drum 12 and wheel electrode 18 and in the vertical plane containing the said axes, and also immediately above the web 49 of the peripheral wall 44. The rod electrode 31 is disposed with its axis inclined to the vertical in a plane which is perpendicular to the axis of the wheel electrode 18 and the direction of such inclination is such that the tip 32 of the electrode 31 is disposed in advance of the axis of the carrier 30 in relation to the direction of rotation of the drum which is indicated by the arrow 51 in Fig. 3.

The tip 32 of the rod electrode 31 is spherical so that there is substantially point contact of the electrode with the top wall 46 of the blanket. In order to avoid undue wear of the tip, the electrode may be rotated on its axis in the carrier 30. The tip 32 is provided on a copper element 52 which is removably attached, for example, by screw-thread engagement, to the shank of the rod 31.

When the blanket 13 is correctly positioned on and secured to the drum 12 the welding current is switched on, and then the motor driving the drum 12 is switched on so that the drum with the blanket 31 rotates. Air is passed to the air cylinder 37, by operating a suitable control on the cabinet 11, so as to press the rod 34 downwards and thereby, through the lever 36 and carrier 30, press the tip 32 of the electrode 31 into intimate contact with the top wall 46 of the blanket at the position of the desired final weld 47 at a predetermined pressure suitably regulated by known control means. A weld 47 will be completed along the whole edge of the blanket whilst the blanket rotates over the freely rotatable wheel electrode 18 and under the substantially stationary rod electrode 31, although the electrode 31 may oscillate slightly whilst retaining contact with the blanket as the latter rotates. The idler wheel electrode 18 will be caused to rotate by reason of its contact with the under-face of the bottom flange 43 of the peripheral wall 44 of the blanket.

The weld can be effected with the application of comparatively low mechanical pressure, regulated by the air pressure applied at the cylinder 37, because of the low contact area of the tip 32 of the rod electrode 31 with the blanket envelope. Thereby, the risk of collapse of the web 49 of the channel section member forming the peripheral wall 44 of the blanket envelope is substantially reduced.

The positive driving of the work, that is the drum 12 with the blanket 13, as opposed to positively driving a wheel electrode such as the electrode 18, ensures positive movement of the work without slipping relative to the electrodes.

The rotatable idler wheel electrode 18 provides a comparatively large and positive contact area with the envelope at a position remote from the position of the required weld 47. The result of this seam weld is that the joint is leak proof.

A stream of water or other coolant is fed to the welding electrodes by way of the nozzle 53 leading from a pump within the cabinet 11. The coolant falls into a well 54 from which the pump withdraws the coolant through a pipe 55.

A foot-operated switch 56 is provided for controlling the motor driving the drum 12.

The invention may be adapted for effecting a planar weld in a flat blanket, in which case a flat bed will be used and will be adapted to be traversed past the electrodes.

What I claim and desire to secure by Letters Patent is:

1. A method for making a seam-weld joint between metallic members in a structure, comprising disposing the said structure between a rotatable idler wheel electrode and a rod electrode, whereby the said rod electrode makes intimate contact with an accessible face of the joint, causing the structure to travel between said two electrodes whereby the rotatable idler wheel electrode is caused to rotate and the rod electrode is caused to remain in said intimate contact with the said accessible face of the joint throughout the length of said joint, applying pressure to said rod electrode in the direction towards said idler wheel electrode, and passing an electric welding current through said electrodes and said structure.

2. Apparatus for carrying out the method according to claim 1, comprising an idly rotatable wheel electrode, a rod electrode, a holder for said rod electrode, said holder being adapted for mechanical pressure to be applied to said electrode in the direction of said wheel electrode, a movable bed adapted for the said structure to be secured thereto, said bed also being adapted to be disposed in such relation to said electrodes that upon said bed, together with the structure secured thereto, being moved the said joint in the structure is caused to travel between said electrodes with the said accessible face of the joint retained in contact with the rod electrode throughout the length of the joint.

3. Apparatus according to claim 2 wherein the rod electrode is disposed in a position inclined to a plane containing the axis of the wheel electrode and the operative end of the rod electrode.

4. Apparatus according to claim 3, wherein the inclined rod electrode is in a plane which is substantially perpendicular to the axis of the wheel electrode.

5. Apparatus according to claim 2, wherein the operative end of the rod electrode is substantially spherical.

References Cited in the file of this patent

UNITED STATES PATENTS

| | | |
|---|---|---|
| 1,031,812 | Nailler | July 9, 1912 |
| 1,965,521 | Cutter | July 3, 1934 |
| 2,274,631 | Meredith | Feb. 24, 1942 |